US012802671B2

(12) United States Patent
Yamaguchi

(10) Patent No.: US 12,802,671 B2
(45) Date of Patent: Nov. 17, 2026

(54) KEYBOARD DEVICE FOR KEYBOARD INSTRUMENT

(71) Applicant: KABUSHIKI KAISHA KAWAI GAKKI SEISAKUSHO, Hamamatsu (JP)

(72) Inventor: Tsutomu Yamaguchi, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 634 days.

(21) Appl. No.: 18/478,611

(22) Filed: Sep. 29, 2023

(65) Prior Publication Data

US 2024/0112660 A1 Apr. 4, 2024

(30) Foreign Application Priority Data

Oct. 4, 2022 (JP) ................................ 2022-159933

(51) Int. Cl.
*G10H 1/34* (2006.01)

(52) U.S. Cl.
CPC ....... *G10H 1/346* (2013.01); *G10H 2220/221* (2013.01); *G10H 2220/265* (2013.01)

(58) Field of Classification Search
CPC ............. G10H 1/346; G10H 2220/221; G10H 2220/265; G10H 1/34
See application file for complete search history.

(56) References Cited

U.S. PATENT DOCUMENTS

| | | | | | |
|---|---|---|---|---|---|
| 12,315,474 | B2 * | 5/2025 | Ichikawa | G10B 3/10 | |
| 2020/0090633 | A1 | 3/2020 | Terai et al. | | |
| 2023/0097634 | A1 * | 3/2023 | Yamaguchi | G10H 1/346 | 84/433 |
| 2023/0097821 | A1 * | 3/2023 | Yamaguchi | G10H 1/346 | 84/433 |
| 2023/0317040 | A1 * | 10/2023 | Yamaguchi | G10H 1/346 | 84/744 |
| 2023/0317041 | A1 * | 10/2023 | Kito | G10H 1/346 | 84/744 |
| 2024/0112658 | A1 * | 4/2024 | Kito | G10H 1/346 | |

FOREIGN PATENT DOCUMENTS

JP 2020-52391 A 4/2020

* cited by examiner

*Primary Examiner* — Jeffrey Donels
(74) *Attorney, Agent, or Firm* — WOMBLE BOND DICKINSON US LLP

(57) ABSTRACT

A keyboard device for a keyboard instrument includes a keyboard chassis, a key disposed on the keyboard chassis, and a key support mechanism which supports the key from below and causes the key to operate such that the key pivotally moves about a virtual pivot. A first arm rear-side connecting portion includes a connecting shaft extending in a left-right direction, and a second arm front-side connecting portion includes an engagement recess which is formed into a U shape open forward in side view and is engaged with the connecting shaft. An upper cushioning member and a lower cushioning member in sliding contact with an outer peripheral surface of the connecting shaft are mounted on the engagement recess in a state covering an upper portion and a lower portion of an inner surface of the engagement recess.

3 Claims, 11 Drawing Sheets

KEYBOARD DEVICE FOR KEYBOARD INSTRUMENT

CROSS-REFERENCE TO RELATED APPLICATION

This application claims priority to Japanese Patent Application Number 2022-159933, filed on Oct. 4, 2022, the entire content of which is incorporated by reference herein.

BACKGROUND OF THE INVENTION

Field of the Invention

The present invention relates to a keyboard device for a keyboard instrument, which is applied to a keyboard instrument, such as an electronic piano, and in which a depressed one of keys operates such that it pivotally moves about a virtual pivot located rearward of a rear end of the key.

Description of the Related Art

Conventionally, as this type of a keyboard device, there has been known, for example, one disclosed in Japanese Laid-Open Patent Publication (Kokai) No. 2020-52391 (FIGS. 3 to 5) already filed by the present applicant. This keyboard device includes a key extending in a front-rear direction and a linkage supporting the key from below. The linkage includes a front-side connecting link bar and a rear-side connecting link bar each extending a predetermined length in the front-rear direction, and a front end of the front-side connecting link bar is pivotally connected to a front portion of the key, whereas a rear end of the rear-side connecting link bar is pivotally connected to a rear end of the key. Further, each of the connecting link bars is pivotally supported via a support pin provided in the vicinity of a longitudinal center thereof. A rear end of the front-side connecting link bar and a front end of the rear-side connecting link bar are pivotally and slidably connected to each other. More specifically, a slot is formed at the rear end of the front-side connecting link bar, whereas a center connecting pin inserted through the slot is erected on the front end of the rear-side connecting link bar.

In the keyboard device constructed as described above, when the front end of the key is pressed down, each connecting link bar of the linkage is pivotally moved about its support pin in a predetermine direction. In this case, the center connecting pin of the rear-side connecting link bar slides in the slot of the front-side connecting link bar along a longitudinal direction thereof, while being pivotally moved. When the front end of the key is pressed down to its lowest position, the rear end of the key is positioned lower by a distance which is approximately half of a travel distance of the front end of the key. With this, the key operates such that it pivotally moves about a virtual pivot located rearward by almost the same length as the length of the key, and consequently, it is possible to obtain the same key operation as that of a keyboard of an acoustic grand piano in spite of the key being configured such that it has a shorter length than that of a key of the acoustic grand piano.

In the above-described conventional keyboard device, the connecting link bars of the linkage are made of a hard material, such as a metal, and hence there is a fear that key operation cannot be properly performed depending on the relationship between the diameter of the center connecting pin of the rear-side connecting link bar and the lateral width of the slot of the front-side connecting link bar. More specifically, in a case where the diameter of the center connecting pin is smaller than the lateral width of the slot so that a relatively large gap is formed between the center connecting pin and a side surface of the slot in a direction of the width thereof, there is a fear that noise is generated by the center connecting pin hitting against the side surface of the slot during key depression. Contrary to the above, in a case where almost no such a gap is formed, the center connecting pin cannot slide smoothly in the slot, which sometimes makes touch feeling heavier when depressing the key.

Further, in the above-described keyboard device, when an inner portion of the key, such as a longitudinal center or its vicinity of the key, is depressed for key depression, the responsiveness of the front-side connecting link bar is sometimes reduced due to the structure of the linkage supporting the key from below. In this case, it is impossible to obtain excellent touch feeling.

SUMMARY OF THE INVENTION

It is an object of the present invention to provide a keyboard device for a keyboard instrument, which is capable of not only preventing noise from being generated by key depression at a connecting portion between a first arm and a second arm of a key support mechanism but also ensuring smooth operation of the connecting portion, thereby providing excellent touch feeling.

To attain the above object, the present invention provides a keyboard device for a keyboard instrument, including a keyboard chassis, a key extending a predetermined length in a front-rear direction and disposed on the keyboard chassis, and a key support mechanism engaged with the keyboard chassis and provided so as to support the key from below, the key support mechanism causing, upon depression of the key, the depressed key to operate such that the key pivotally moves about a virtual pivot located rearward of a rear end of the key, wherein the key support mechanism includes a first arm configured to extend a predetermined length in the front-rear direction and be swingably engaged with a first pivot shaft provided on the keyboard chassis, the first arm having a front end pivotally and slidably connected to a front portion of the key, and a second arm configured to extend a predetermined length in the front-rear direction and be swingably engaged with a second pivot shaft provided on the keyboard chassis at a location rearward of the first pivot shaft, the second arm having a rear end pivotally connected to a rear portion of the key, and including a second arm front-side connecting portion which is disposed forward of the second pivot shaft and is pivotally and slidably connected to a first arm rear-side connecting portion rearward of the first pivot shaft of the first arm, wherein one of the first arm rear-side connecting portion and the second arm front-side connecting portion includes an engagement shaft extending in a left-right direction, wherein the other of the first arm rear-side connecting portion and the second arm front-side connecting portion includes an engagement recess which has a U shape in side view open in one of a front direction and a rear direction and is engaged with the engagement shaft, and wherein the engagement recess has an upper cushioning member and a lower cushioning member mounted thereon, the upper cushioning member and the lower cushioning member being in sliding contact with an outer peripheral surface of the engagement shaft in a state covering an upper portion and a lower portion of an inner surface of the engagement recess, respectively.

According to this construction, the key, which extends the predetermined length in the front-rear direction and is disposed on the keyboard chassis, is supported from below by the key support mechanism having the above-described first arm and second arm, and when depressed, is caused to operate such that the key pivotally moves about the virtual pivot located rearward of the rear end of the key. Further, in the key support mechanism, the first arm rear-side connecting portion of the first arm and the second arm front-side connecting portion of the second arm are pivotally and slidably connected. One of the first arm rear-side connecting portion and the second arm front-side connecting portion includes the engagement shaft extending in the left-right direction, and the other thereof includes the engagement recess which has the U shape in side view open in one of the front direction and the rear direction. The upper cushioning member and the lower cushioning member in sliding contact with the outer peripheral surface of the engagement shaft are mounted on the engagement recess in the state covering the upper portion and the lower portion of the inner surface of the engagement recess, respectively. As described above, since the upper cushioning member and the lower cushioning member are mounted on the engagement recess, the engagement recess is prevented from directly hitting against the outer peripheral surface of the engagement shaft, and therefore, it is possible to prevent generation of noise from the connecting portion between the first arm and the second arm of the key support mechanism, at the time of key depression. Further, since the upper cushioning member and the lower cushioning member mounted on the engagement recess are in sliding contact with the engagement shaft, it is possible to ensure smooth operation of the connecting portion between the first arm and the second arm, whereby it is possible to obtain excellent touch feeling by key depression.

Preferably, the upper cushioning member and the lower cushioning member are configured to be different in cushioning property from each other.

According to the construction of this preferred embodiment, since the upper cushioning member and the lower cushioning member are configured to be different in cushioning property from each other, it is possible to easily adjust the touch feeling such that excellent touch feeling can be obtained irrespective of the position of a fingertip which depresses the key, for example. Note that in the present specification, the term "cushioning property" includes hardness, elastic coefficients, and/or frictional coefficients of surfaces in sliding contact with the engagement shaft, of the upper cushioning member and the lower cushioning member.

More preferably, the lower cushioning member is formed to be harder than the upper cushioning member.

According to the construction of this preferred embodiment, the lower cushioning member is formed to be harder than the upper cushioning member, so that, e.g. when an inner portion of the key is depressed, it is possible to obtain an excellent operational response of the first arm and consequently obtain a satisfactorily responsive touch feeling.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a part (one octave section) of a keyboard device for an electronic piano to which the present invention is applied, in which FIG. 1A shows the appearance of the keyboard device and FIG. 1B shows a state in which keys other than a white key and a black key at a left end of the keyboard device are omitted;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism therefor, in which FIG. 5A shows the black key and the key support mechanism in a connected state and FIG. 5B shows the black key and the key support mechanism in an exploded state;

FIGS. 6A and 6B are views useful in explaining operation of the white key in the keyboard device, in which FIG. 6A shows a key-released state and FIG. 6B shows a key-depressed state;

FIG. 7A and 7B are views useful in explaining operation of the black key in the keyboard device, in which FIG. 7A shows a key-released state and FIG. 7B shows a key-depressed state;

FIGS. 8A to 8C are diagrams useful in explaining an essential part of the present invention, in which FIG. 8A is a perspective view of the white key and the key support mechanism therefor, FIG. 8B shows a second arm of the key support mechanism, and FIG. 8C shows the second arm in a state in which an upper cushioning member and a lower cushioning member are removed from the second arm;

FIGS. 11A and 11B are views useful in explaining forces acting on the key and the second arm, which are caused by different key pressing positions at the time of key depression, in which FIG. 11A shows a case where a front end of the key is depressed, and FIG. 11B shows a case where an inner portion of the key is depressed.

DETAILED DESCRIPTION OF PREFERRED EMBODIMENTS

Figure 1A:
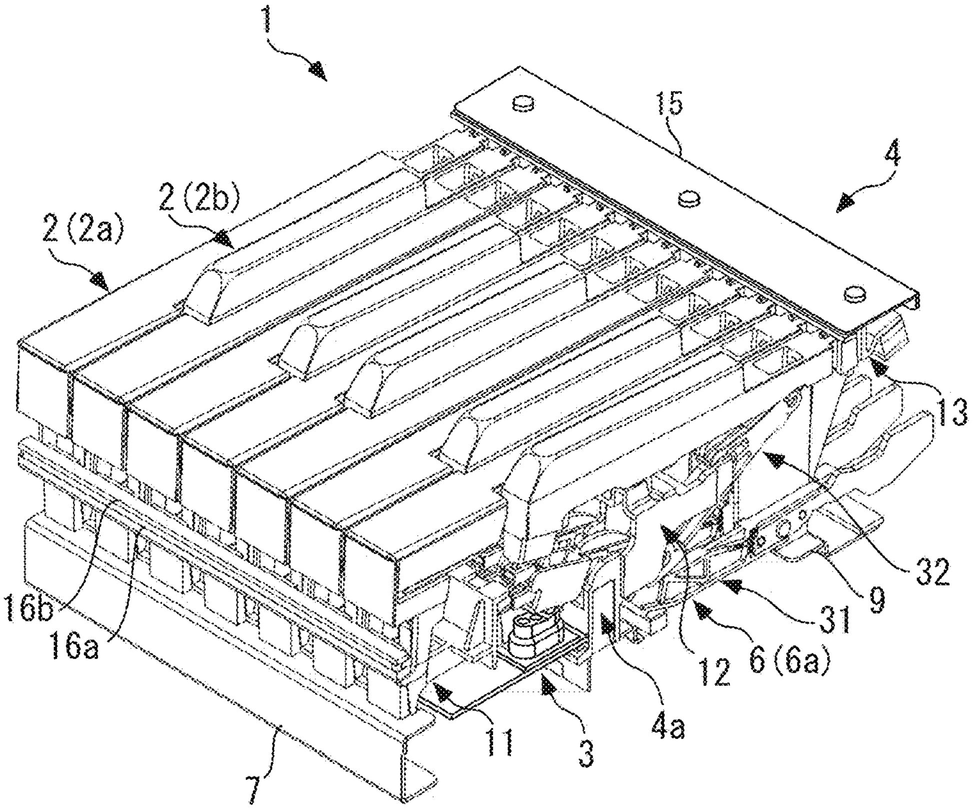

The present invention will now be described in detail with reference to the drawings showing preferred embodiments thereof. FIG. 1A shows only one octave section of a keyboard device 1 for an electronic piano to which the present invention is applied. Note that in the following, a description will be first given of the basic construction of the keyboard device 1 and operation thereof, and then of an essential part of the present invention.

Figure 1B:
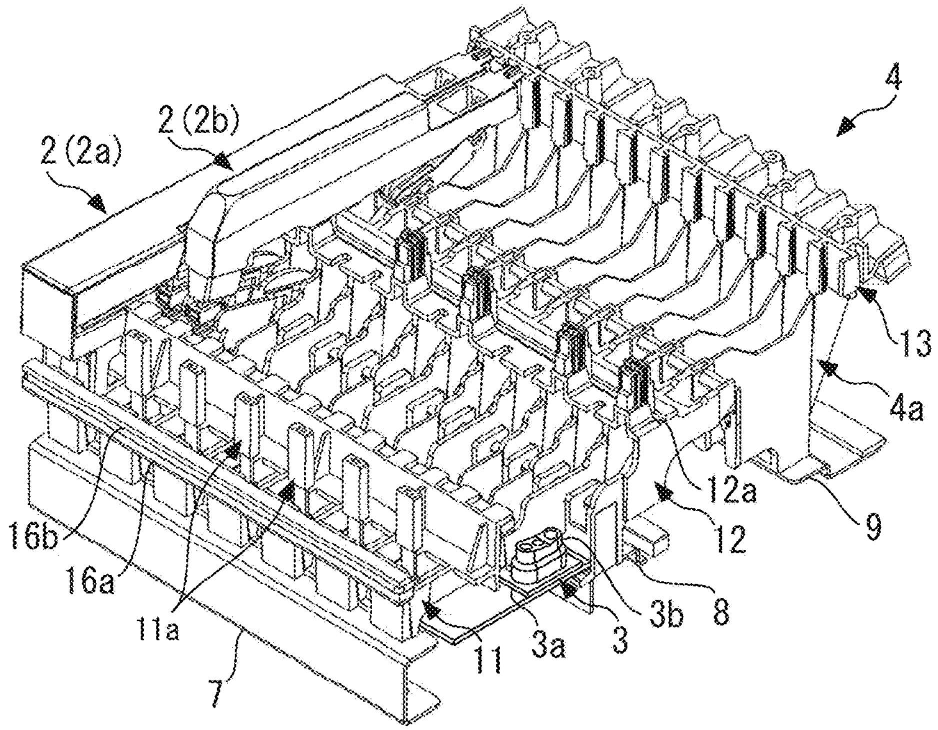
Figure 2:
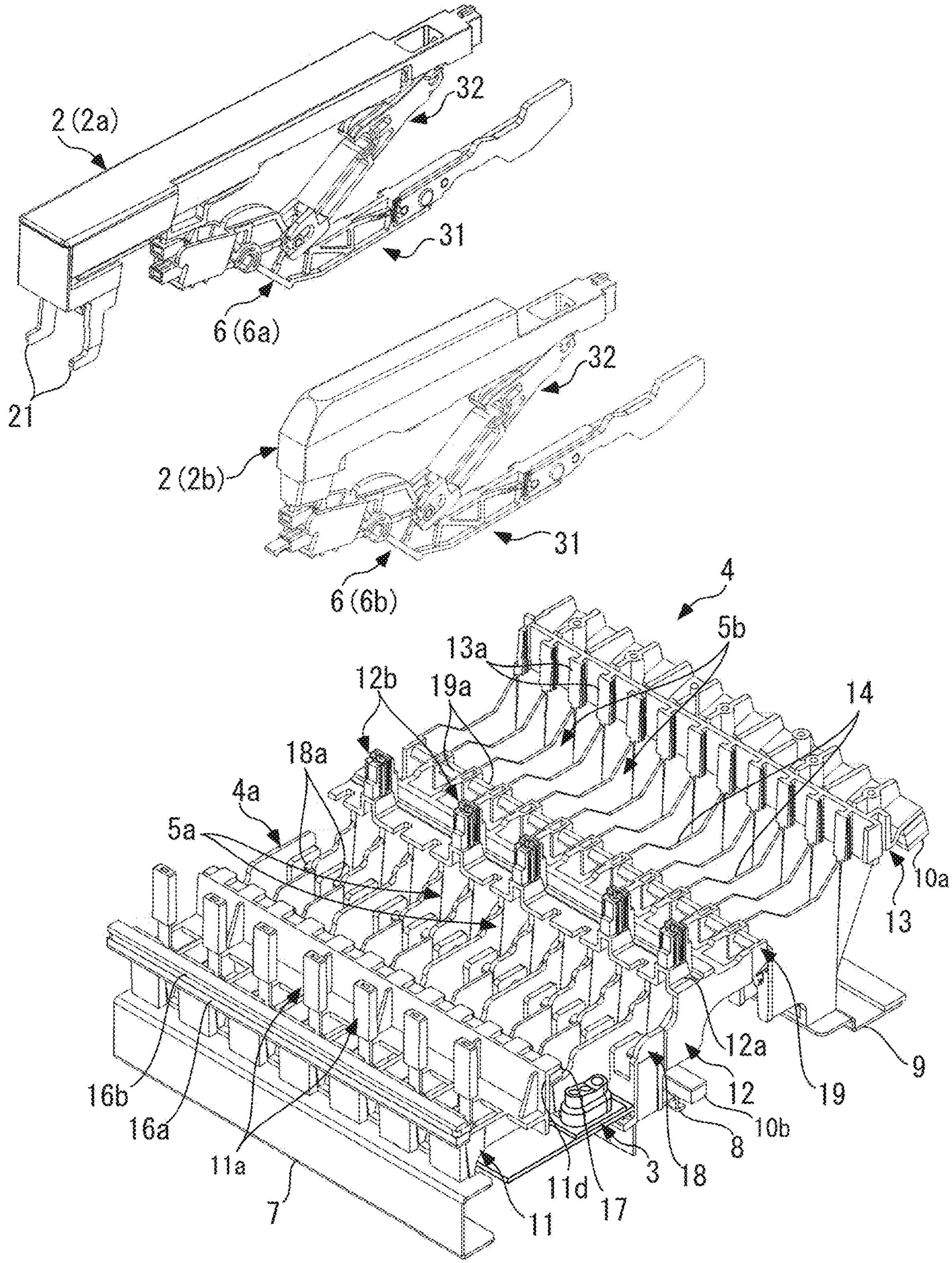
FIG. 2 is a perspective view of the keyboard device shown in FIG. 1B in a state in which the white key and the black key are removed, together with respective key support mechanisms therefor, from a keyboard chassis.

FIG. 1B shows a state of the keyboard device 1 shown in FIG. 1A, in which keys 2 other than a white key 2_a_ and a black key 2*b* at the left end of the keyboard device 1 are omitted. FIG. 2 shows a state of the keyboard device 1 shown in FIG. 1B, in which the white key 2*a* and the black key 2*b* are removed, together with respective key support mechanisms 6 therefor, from a keyboard chassis 4.

This keyboard device 1 is comprised of the keyboard chassis 4, the plurality of keys 2 including the white keys 2*a* and the black keys 2*b* and disposed in a side-by-side arrangement in a left-right direction, the key support mechanisms 6 each pivotally mounted on the keyboard chassis 4, for supporting an associated one of the keys 2 from below, and key switches 3 each for detecting key depression information of an associated one of the keys 2.

Figure 3A:
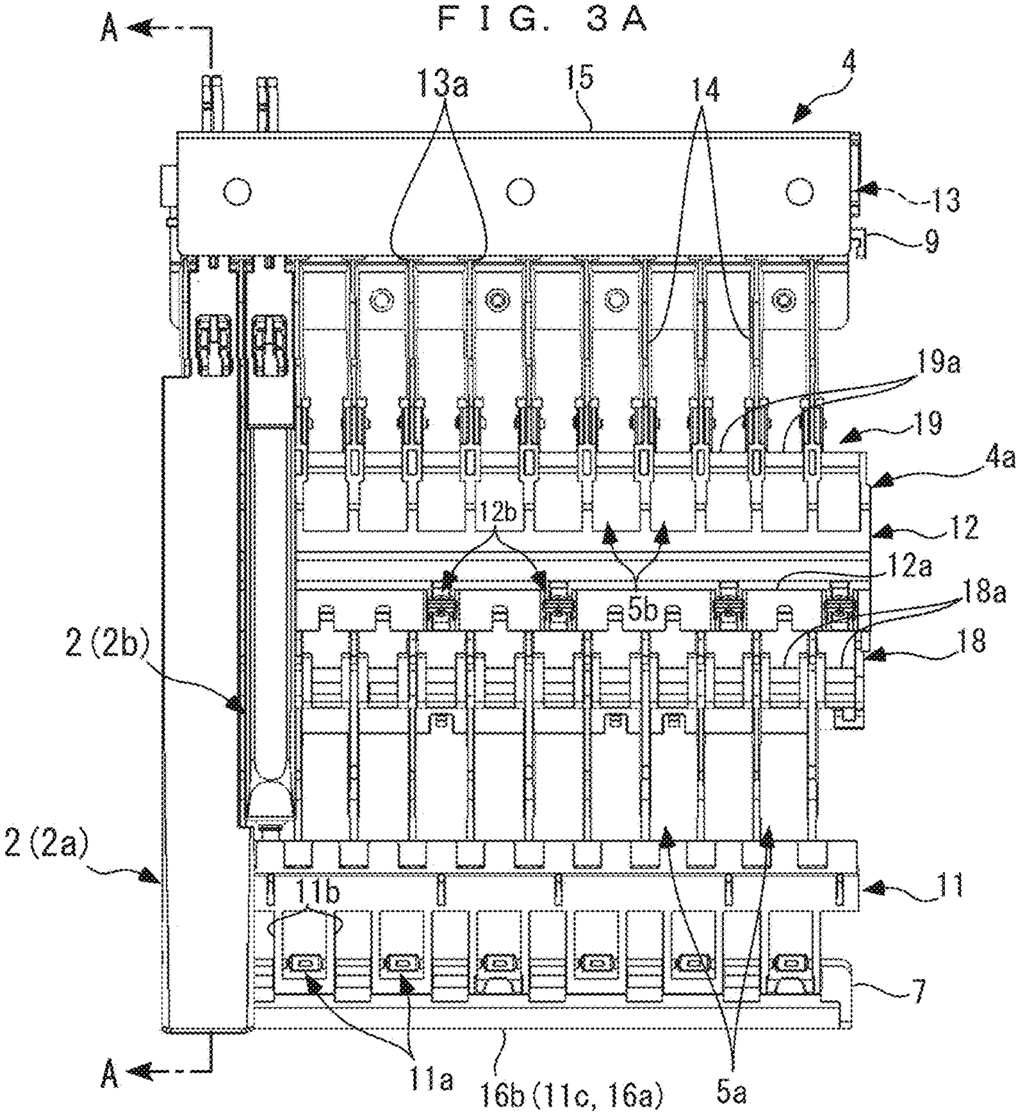
FIG. 3A is a plan view of the keyboard device shown in FIG. 1B
Figure 3B:
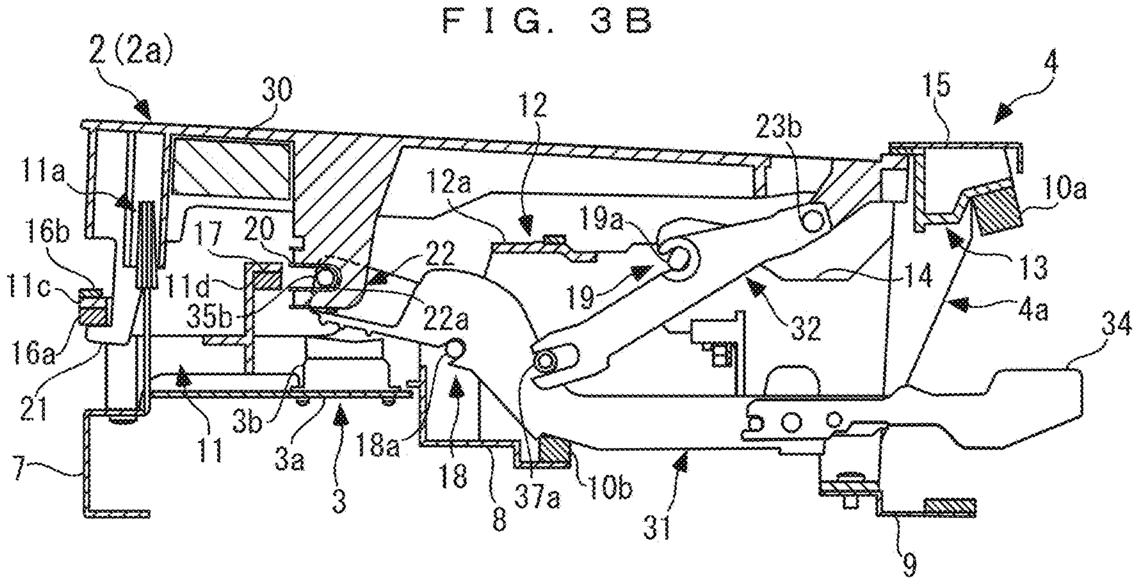
FIG. 3B is a cross-sectional view taken along line A-A of FIG. 3A.

The keyboard chassis 4 includes a chassis body 4*a* formed as a resin molded article which is made e.g. by injection molding of a predetermined resin material (e.g. an ABS resin) into a predetermined shape. As shown in FIGS. 3A and 3B, the chassis body 4*a* has a front portion 11, an intermediate portion 12, and a rear portion 13, each extending in the left-right direction (in a left-right direction in FIG. 3A) as a whole. The front portion 11, the intermediate portion 12, and the rear portion 13 are integrally formed with each other via a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as "the chassis front 11", "the chassis intermediate 12", and "the chassis rear 13", respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough. Furthermore, the chassis front 11 has a front end thereof formed with a stopper-mounting portion 11*c* that protrudes forward and extends along the entirety of the chassis body 4*a* in the left-right direction. A key upper limit stopper 16*a* and a key lower limit stopper 16*b* for the white key 2*a* are mounted on a lower surface and an upper surface of the stopper-mounting portion 11*c*, respectively, such that they extend in the left-right direction. Note that a stopper-mounting portion 11*d* for the black key, which extends along the entirety of the chassis body 4*a* in the left-right direction, is provided at a predetermined location of the chassis front 11, rearward of each white key guide 11*a*, and that a key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32, described hereinafter, of each of a white key-associated key support mechanism 6*a* and a black key-associated key support mechanism 6*b*. The chassis intermediate 12 has a flat portion 12*a* in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Further, the chassis intermediate 12 has a front portion thereof provided with a first arm support portion 18 for supporting the first arms 31 of the key support mechanisms 6. The first arm support portion 18 has a plurality of first pivot shafts 18*a* each of which is provided between each adjacent two of the ribs 14 and 14 such that the first pivot shaft 18*a* extends in the left-right direction. The first arms 31 are swingably supported on associated ones of the first pivot shafts 18*a*. Furthermore, the chassis intermediate 12 has a rear portion thereof provided with a second arm support portion 19 for supporting the second arms 32 of the key support mechanisms 6. The second arm support portion 19 has a plurality of second pivot shafts 19*a* each of which is provided between each adjacent two of the ribs 14 and 14 such that the second pivot shaft 19*a* extends in the left-right direction. The plurality of second pivot shafts 19*a* are arranged on the same axis extending in the left-right direction at a location rearward of and higher than the first pivot shafts 18*a*, and the second arms 32 are swingably supported on associated ones of the second pivot shafts 19*a*. Note that a first arm lower limit stopper 10*b* extending along the entirety of the chassis body 4*a* in the left-right direction is provided at a predetermined location of a middle rail 8, referred to hereinafter, disposed below the chassis intermediate 12.

Further, the above-mentioned key switches 3 are provided on a lower portion of the keyboard chassis 4 between the above-described chassis front 11 and chassis intermediate 12. The key switches 3 are formed by a laterally elongated printed circuit board 3*a* extending in the left-right direction, and a plurality of switch bodies 3*b* formed by rubber switches attached to the printed circuit board 3*a* on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions of the rear ends of associated ones of the first arms 31. As shown in FIGS. 2 and 3A, the chassis rear 13 has a plurality of partition walls 13*a* formed with a predetermined spacing therebetween in the left-right direction so as to separate each adjacent two of the keys 2 and 2 from each other. Further, as shown in FIG. 3B, a first arm upper limit stopper 10*a* extending along the entirety of the chassis body 4*a* in the left-right direction is provided at a predetermined location of an upper portion of the chassis rear 13. The first arm upper limit stopper 10*a* and the first arm lower limit stopper 10*b* provided on the chassis intermediate 12 are for restricting the upper limit position and the lower limit position of the first arm 31, respectively, when the first arm 31 having a function as a hammer for adding a touch weight to the key 2 pivotally moves upward and downward. Furthermore, a metal cover plate 15 extending in the left-right direction along the entirety of the chassis body 4*a* and disposed to cover the rear ends of the keys 2 is mounted on the upper portion of the chassis rear 13.

As shown in FIGS. 2 and 3A, the chassis body 4*a* of the keyboard chassis 4 constructed as described above is formed with a plurality of first openings 5*a* open upward and forward and a plurality of second openings 5*b* open upward. The first arms 31 of the key support mechanisms 6 are engaged with associated ones of the first pivot shafts 18*a* from outside via the above-mentioned first openings 5*a*, respectively. Further, the second arms 32 are engaged with associated ones of the second pivot shafts 19*a* from outside via the above-mentioned second openings 5*b*, respectively.

Further, in the above-described keyboard chassis 4, a plurality of chassis bodies 4*a* are connected to each other in a state arranged side by side in the left-right direction, and are each screwed to a front rail 7, the middle rail 8, and a rear rail 9 in a state placed thereon, the rails 7, 8 and 9 each extending in the left-right direction and arranged with a predetermined spacing therebetween in the front-rear direction. The keyboard chassis 4 is fixed to a keybed, not shown, of the electronic piano via the front rail 7 and the rear rail 9.

Figure 4A:
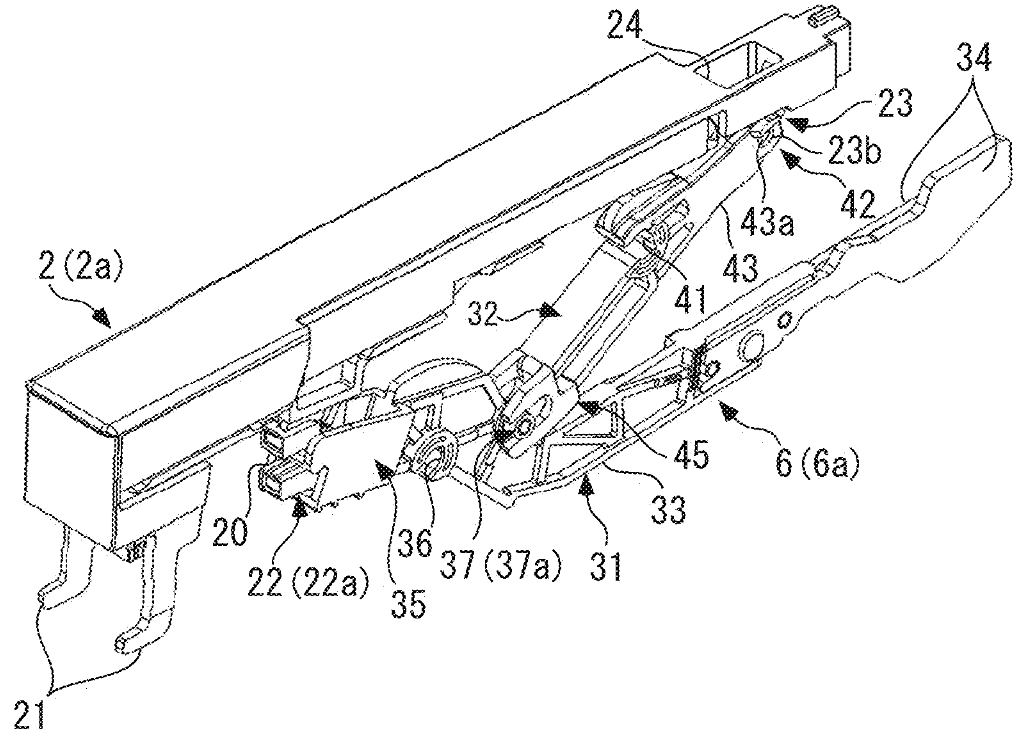
Figure 4B:
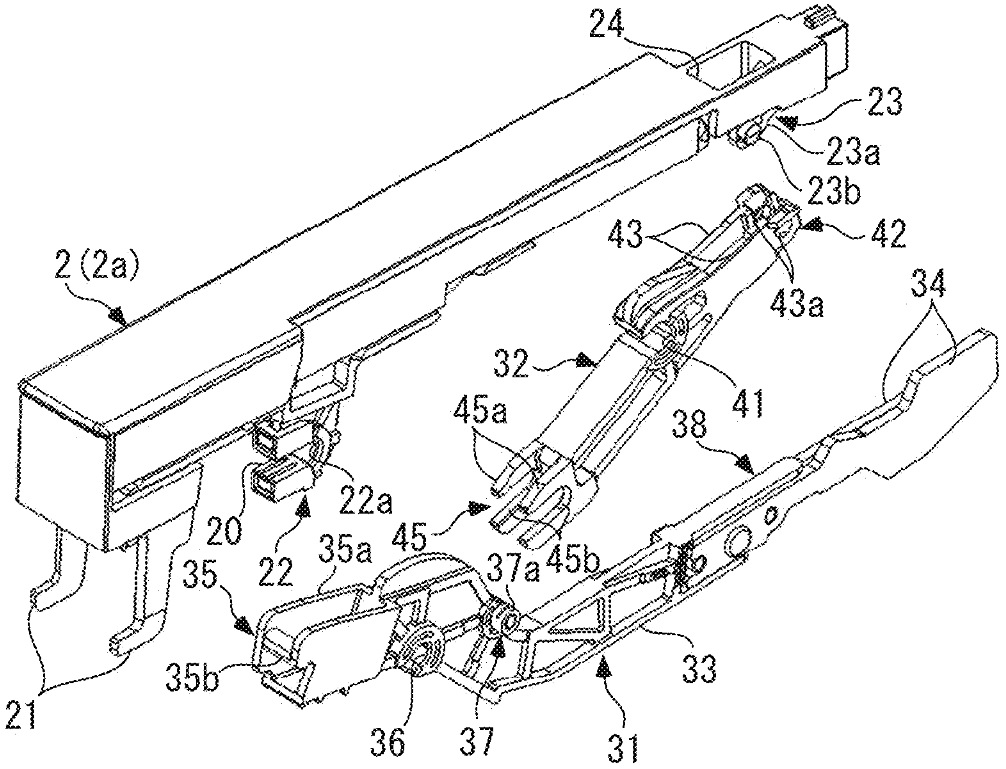

Next, the keys 2 and the key support mechanisms 6 will be described. FIG. 4A shows the white key 2*a* and the key support mechanism 6*a* therefor on an enlarged scale, and FIG. 4B shows them in an exploded state. As shown in FIGS. 4A and 4B, the white key 2*a* is formed e.g. by injection molding of a predetermined resin material (e.g. an AS resin) into a hollow shape which extends a predetermined length in the front-rear direction and opens downward. The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of a front portion of the white key 2*a*, rearward of the upper limit position regulation portions 21, there is formed a key front-side connecting portion 22 connected to the first arm 31 of the key support mechanism 6*a*. This key front-side connecting portion 22 includes a connecting recess 22*a* formed into a U shape having a slot-like shape in side view and open forward. Further, the connecting recess 22*a* has a cushioning member 20 attached thereto, which is formed to cover the whole inner peripheral surface of the connecting recess 22*a*, for suppressing generation of noise when a connecting shaft 35*b*, referred to hereinafter, of the first arm 31 slides in the inner peripheral surface of the connecting recess 22*a*. Note that in the front portion of the white key 2*a*, between the above-mentioned upper limit position regulation portions 21 and key front-side connecting portion 22, there is mounted a key weight 30 (see FIG. 3B) for adding a desired touch weight to the white key 2*a* during depression thereof.

Furthermore, the white key 2*a* has a rear portion thereof provided with a key rear-side connecting portion 23 connected to the second arm 32 of the key support mechanism 6*a*. The key rear-side connecting portion 23 has a plate-like connecting body portion 23*a* which hangs downward from a laterally central portion of the white key 2*a* and has a predetermined thickness in the left-right direction, and a pair of left and right engagement protrusions 23*b* and 23*b* which coaxially protrude from the left and right side surfaces of the connecting body portion 23*a*, respectively. Further, the rear portion of the white key 2*a* is formed with a tool insertion hole 24 which vertically extends through the rear portion, and is used to have a predetermined tool inserted therein from above for disconnecting the white key 2*a* from the second arm 32 of the key support mechanism 6*a* e.g. at the time of maintenance of the keyboard device 1.

On the other hand, the key support mechanism 6*a* includes the first arm 31 and the second arm 32 which are engaged with each other and are connected to the key front-side connecting portion 22 and the key rear-side connecting portion 23 of the white key 2*a*, respectively.

As shown in FIG. 4B, the first arm 31 is comprised of an arm body 33 and two weights 34 and 34 attached to the arm body 33. The arm body 33 is formed as a resin molded article which is made e.g. by injection molding of a predetermined resin material (e.g. polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and the connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction.

Further, the arm body 33 has a bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37 formed at a predetermined location rearward of the bearing portion 36, connection to the second arm 32. Specifically, the first arm rear-side connecting portion 37 has a connecting shaft 37*a* which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

The two weights 34 and 34 formed as elongated and narrow plates are mounted on a weight mounting portion 38, which is a rear portion of the arm body 33, in a state sandwiching the weight mounting portion 38. Note that each weight 34 is made of a material (metal such as iron) having a larger specific gravity than the arm body 33, and is formed e.g. by pressing a metal plate into a predetermined shape.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view at about a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a*. The second arm rear-side connecting portion 42 is formed into a bifurcated shape, and has two left and right connecting arm portions 43 and 43 which extend a predetermined length parallel to each other along the longitudinal direction of the second arm 32. Each connecting arm portion 43 has a rear end thereof formed with a connecting hole 43*a* extending through the connecting arm portion 43 in the left-right direction. The two connecting arm portions 43 and 43 sandwich the connecting body portion 23*a* of the key rear-side connecting portion 23 of the white key 2*a* between the rear ends thereof from the left and the right, and each connecting hole 43*a* has an associated one of the engagement protrusions 23*b* of the key rear-side connecting portion 23 pivotally fitted therein.

Furthermore, the second arm 32 has a front portion thereof provided with the second arm front-side connecting portion 45 connected to the first arm rear-side connecting portion 37 of the first arm 31. The second arm front-side connecting portion 45 has a pair of left and right connecting portions 45*a* and 45*a* arranged with a predetermined spacing in the left-right direction. The connecting portions 45*a* and 45*a* are each formed with the connecting recess 45*b* which has a U shape having a slot-like shape in side view and open forward. The left and right connecting portions 45*a* and 45*a* of the second arm front-side connecting portion 45 are pivotally and slidably engaged with the respective opposite ends of the connecting shaft 37*a* of the first arm 31 via the connecting recesses 45*b* and 45*b* thereof.

Figure 5A:
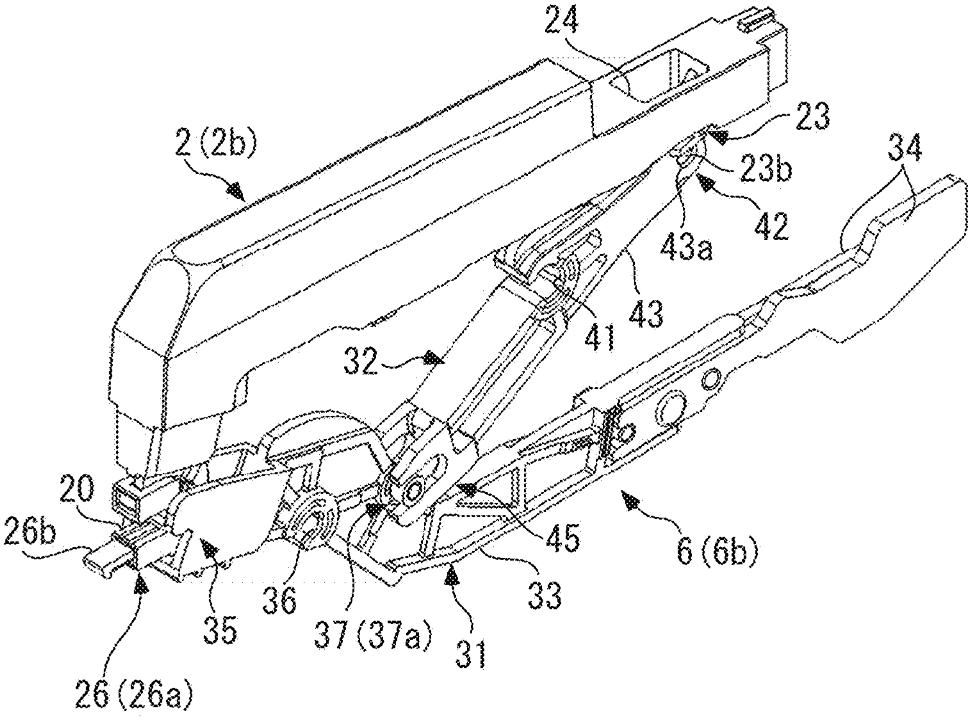
Figure 5B:
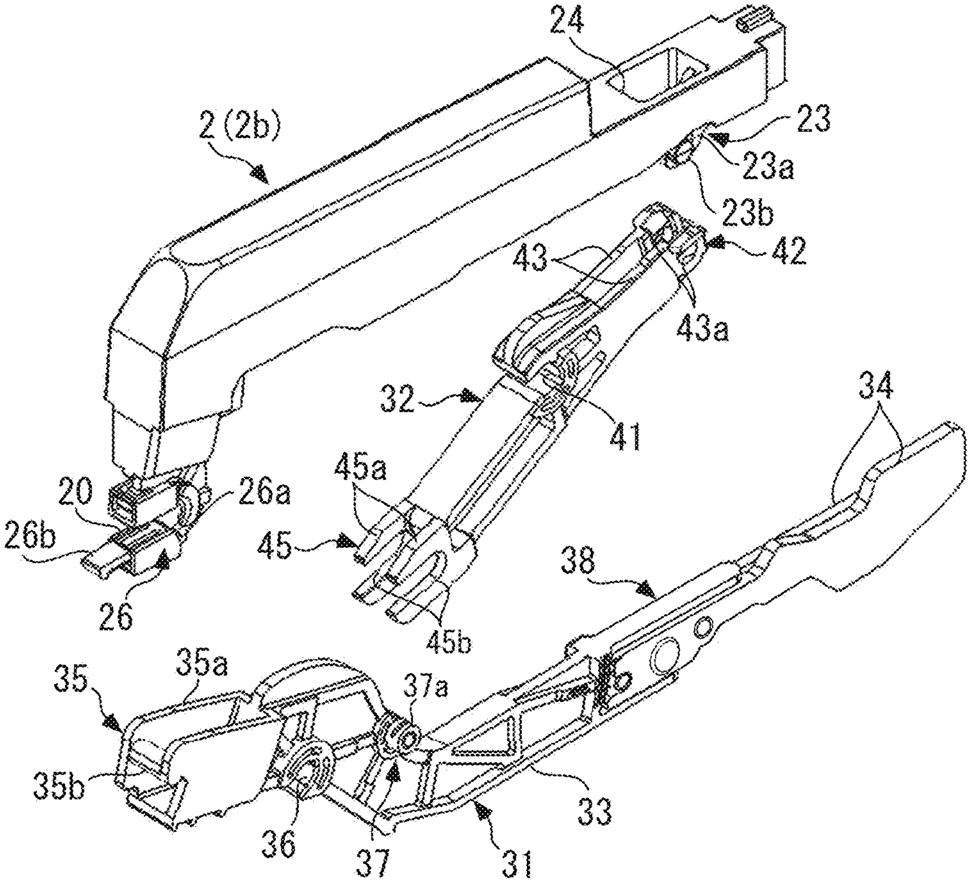

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g. by injection molding of the same resin material as that of the white key 2*a* into a hollow shape which extends in the front-rear direction by a predetermined length shorter than that of the white key 2*a* and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess 26*a* formed into a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the black key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

The key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Note that although in FIGS. 5A and 5B, the two left and right weights 34 and 34 of the key support mechanism 6*b* for the black key 2*b* are illustrated exactly the same as the weights 34 and 34 of the key support mechanism 6*a* for the white key 2*a*, the shapes and lengths of the weights 34 and 34 of the key support mechanisms 6*a* and 6*b* are changed as deemed appropriate according to touch weights required for the keys 2 or the like.

Figure 6A:
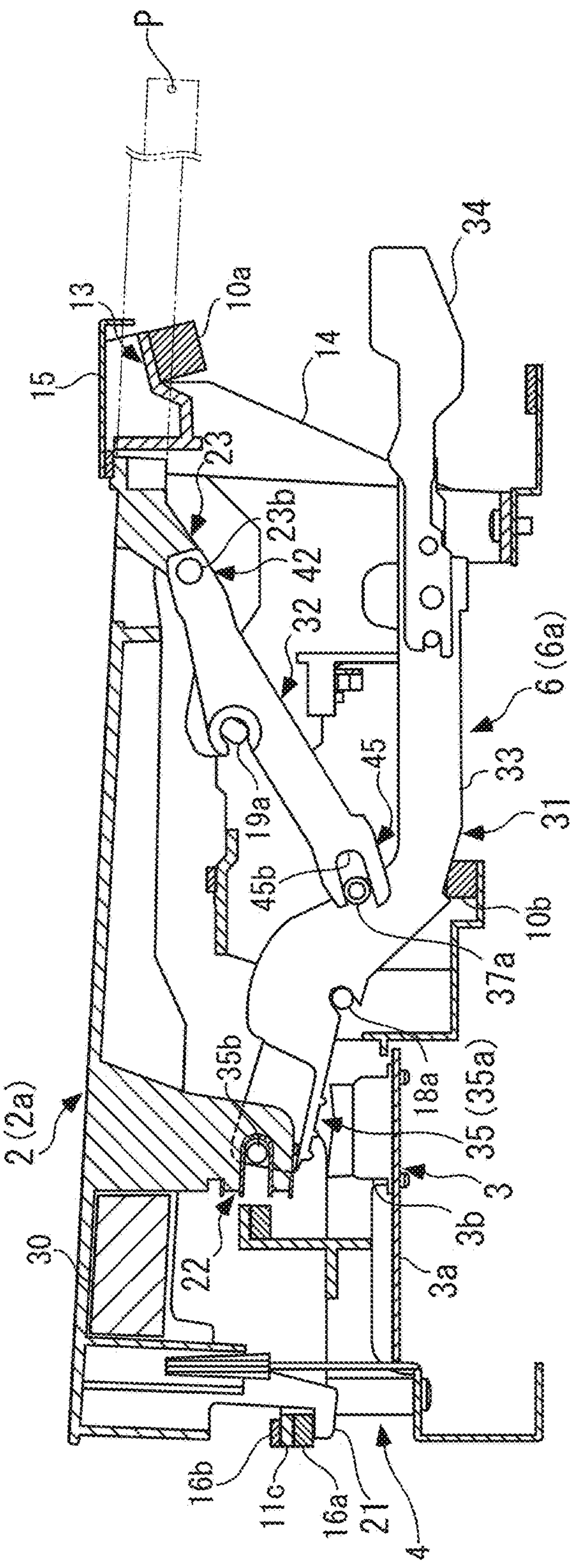
Figure 6B:
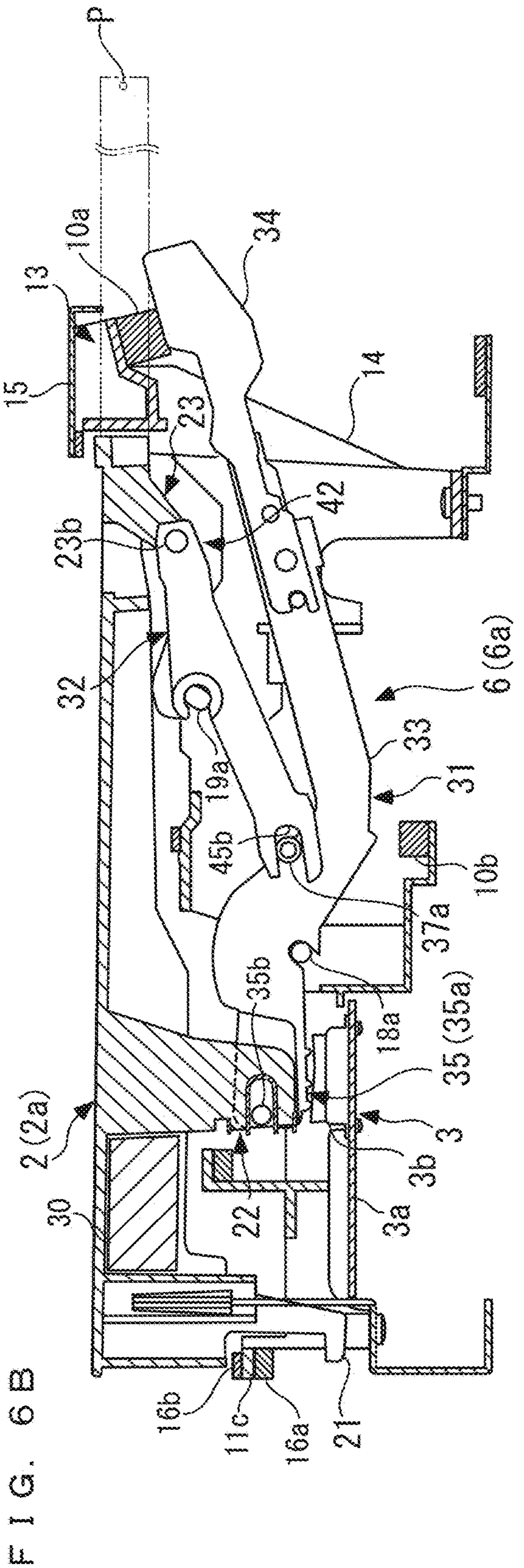
Figure 7A:
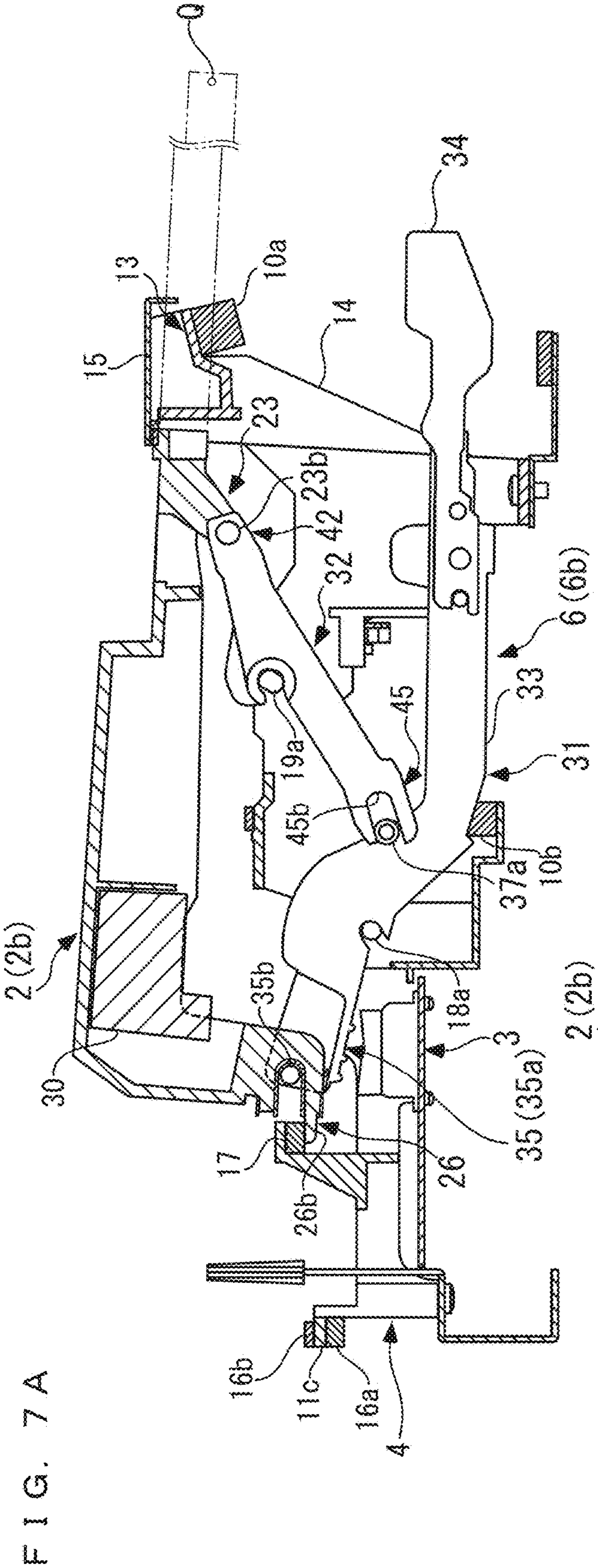
Figure 7B:
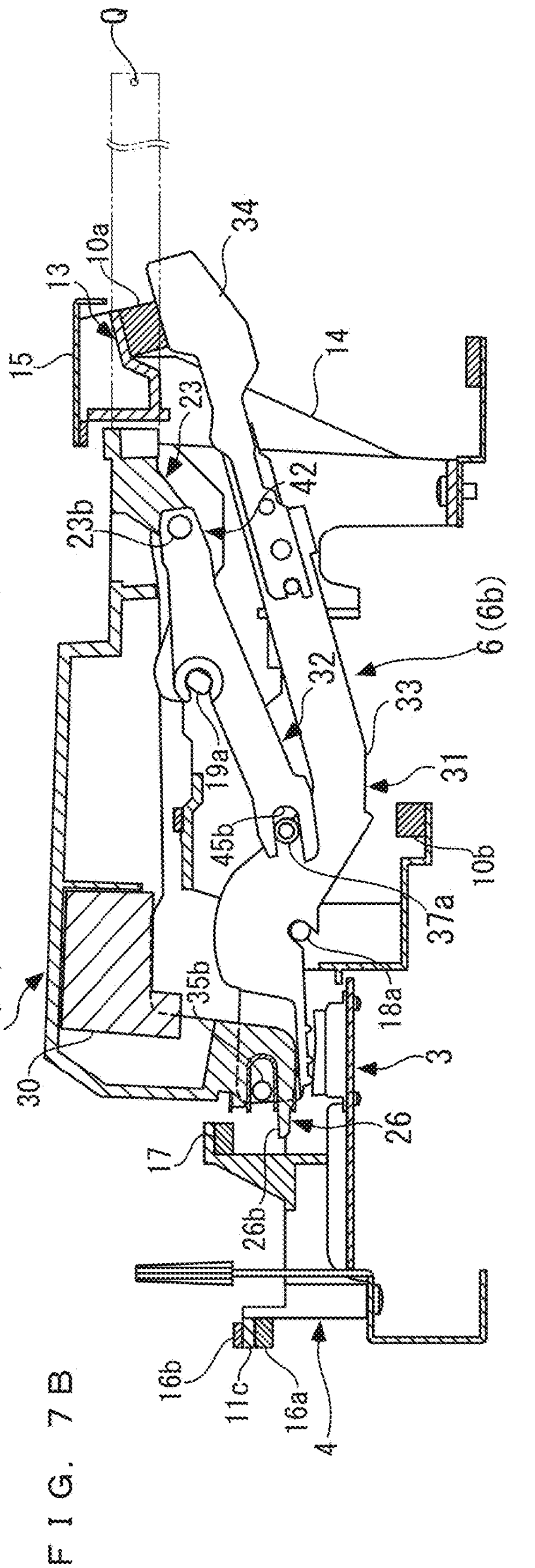

Next, a description will be given of the operation of the keys 2 and the key support mechanisms 6 of the keyboard device 1 constructed as described above. FIGS. 6A and 6B are views useful in explaining the operation of the white key 2*a* and the key support mechanism 6*a* associated therewith. FIGS. 7A and 7B are views useful in explaining the operation of the black key 2*b* and the key support mechanism 6*b* associated therewith.

When the front end of the white key 2*a* is depressed by a player with his/her finger from a key-released state shown in FIG. 6A, the key front-side connecting portion 22 of the white key 2*a* is moved downward, whereby the first arm 31 is pivotally moved in a counterclockwise direction about the first pivot shaft 18*a*. Further, in accordance with the pivotal movement of the first arm 31, the second arm front-side connecting portion 45, which is engaged with the connecting shaft 37*a* of the first arm 31 via the connecting recesses 45*b* and 45*b*, is moved upward. With this, the second arm 32 is pivotally moved in a clockwise direction about the second pivot shaft 19*a*. Then, in accordance with this pivotal movement of the second arm 32, the key rear-side connecting portion 23, which is connected to the second arm 32 via the second arm rear-side connecting portion 42 formed at the rear end of the second arm 32, is pulled down, whereby the rear end of the white key 2*a* is moved downward.

Note that during the above-mentioned pivotal movement of the first arm 31, the box portion 35*a* of the first arm front-side connecting portion 35 is moved downward, and accordingly, the switch body 3*b* of one of the key switches 3, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described hereinabove, in the case where the white key 2*a* is depressed, in accordance with the counterclockwise pivotal movement of the first arm 31, the weight 34 of the first arm 31 is inclined such that the weight 34 becomes higher as it extends rearward, whereby the rear end of the weight 34 is brought into contact with the first arm upper limit stopper 10*a* from below, as shown in FIG. 6B. This prevents further pivotal movement of the first arm 31. When the front end of the white key 2*a* is depressed to its lowest position, the front end of the white key 2*a* is brought into contact with the key lower limit stopper 16*b*, which blocks further depression of the white key 2*a*.

The white key 2*a* depressed as above operates such that it pivotally moves about a virtual pivot P located rearward of the rear end thereof. The location of the virtual pivot P is set such that a distance from the front end of the white key 2*a* is approximately twice as long as the length of the white key 2*a* itself, for example. With this, when the front end of the white key 2*a* is depressed to the lowest position, compared with the case where the white key 2*a* is in the key-released state shown in FIG. 6A, the front end of the white key 2*a* is positioned lower by a predetermined key stroke (e.g. 10 mm) and the rear end of the white key 2*a* is located lower by a distance (e.g. 5 mm) which is approximately half of the predetermined key stroke.

On the other hand, when the finger is released from the white key 2*a* being depressed, the first arm 31 of the key support mechanism 6*a* pivotally moves in a direction opposite to the above-mentioned direction, by the own weight of the weight 34, and in accordance therewith, the second arm 32 as well pivotally moves in a direction opposite to the above-mentioned direction. In accordance with this pivotal movement of the second arm 32, the white key 2*a* pivotally moves upward about the virtual pivot P. Then, a predetermined portion of the first arm 31, rearward of the first pivot shaft 18*a*, moves into contact with the first arm lower limit stopper 10*b* from above, and both of the upper limit position regulation portions 21 and 21 of the white key 2*a* move into contact with the key upper limit stopper 16*a* from below, whereby further pivotal movement of the white key 2*a* is blocked and the white key 2*a* returns to its original key-released state.

Further, when the black key 2*b* is depressed, operations are performed similar to the above-described operations of the white key 2*a* and the key support mechanism 6*a*. More specifically, when a front end of the black key 2*b* is depressed from a key-released state shown in FIG. 7A, the first arm 31 is pivotally moved in the counterclockwise direction about the first pivot shaft 18*a*, and the second arm 32 is pivotally moved in the clockwise direction about the second pivot shaft 19*a*. With this, the black key 2*b* is operated such that it is pivotally moved about a virtual pivot Q located rearward of the rear end thereof. Note that similar to the above-mentioned virtual pivot P of the white key 2*a*, the location of the virtual pivot Q is set such that a distance from the front end of the black key 2*b* is approximately twice as long as the length of the black key 2*b* itself, for example. Therefore, when the front end of the black key 2*b* is depressed to its lowest position, compared with a case where the black key 2*b* is in the key-released state shown in FIG. 7A, the front end of the black key 2*b* is positioned lower by a predetermined key stroke and the rear end thereof is positioned lower by a distance which is approximately half of the predetermined key stroke.

On the other hand, when the finger is released from the black key 2*b* having been depressed, the first arm 31 and the second arm 32 of the key support mechanism 6*b* pivotally move in respective directions opposite to the above-mentioned directions, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal movement of the black key 2*b* is blocked, and the black key 2*b* returns to its original key-released state.

Next, the essential part of the present invention will be described with reference to FIGS. 8A to 8C to FIGS. 11A and 11B. The essential part of the present invention consists in that in the second arm 32 of the key support mechanism 6, an upper cushioning member 51 and a lower cushioning member 52 for sliding contact with the connecting shaft 37*a* (engagement shaft) of the first arm 31 are provided on the second arm front-side connecting portion 45, which is a connecting portion between the second arm 32 and the first arm 31.

Figure 8A:
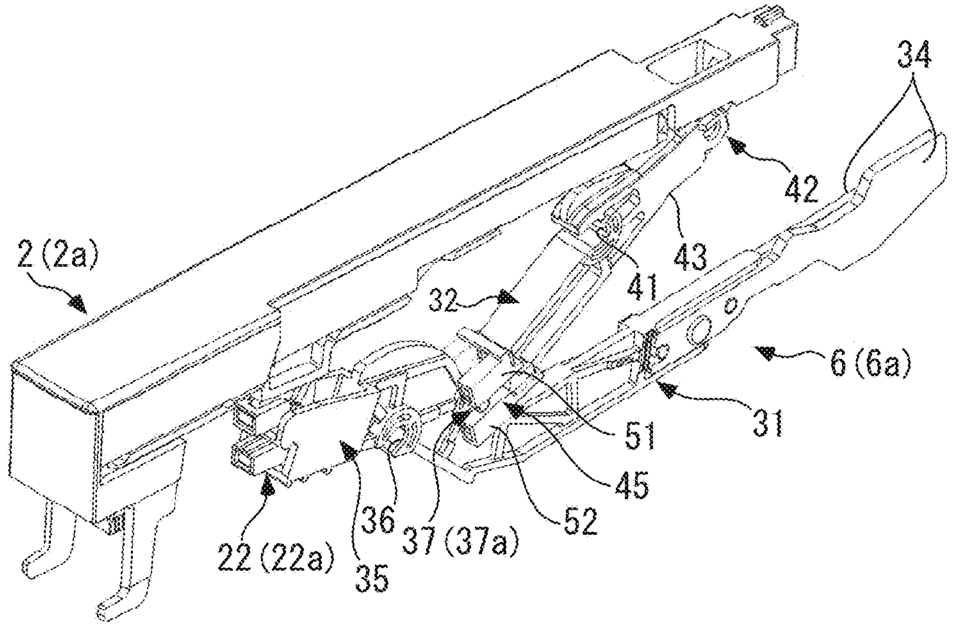
Figure 8B:
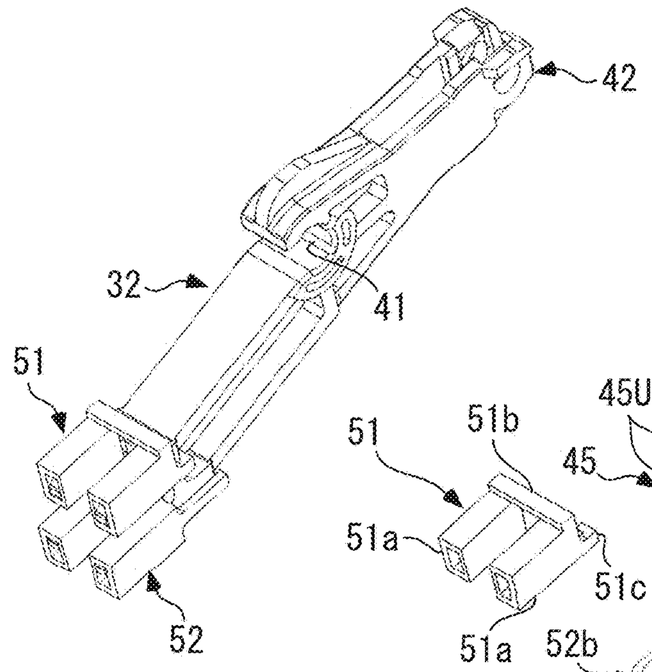
Figure 8C:
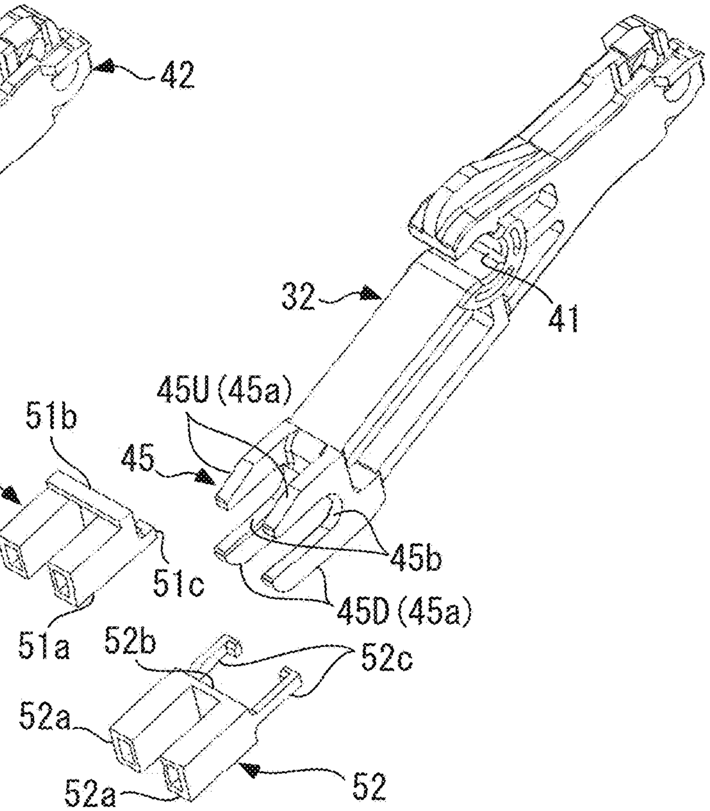

FIG. 8A shows the white key 2*a* and the key support mechanism 6*a* therefor, FIG. 8B shows the second arm 32 of the key support mechanism 6*a*, and FIG. 8C shows a state in which the upper cushioning member 51 and the lower cushioning member 52 are removed from the second arm 32.

The upper cushioning member 51 and the lower cushioning member 52 are each formed as a molded article made of a predetermined elastic synthetic resin (e.g. thermoplastic elastomer).

As shown in FIG. 8C, the upper cushioning member 51 includes two rectangular tube portions 51*a* and 51*a* each extending a predetermined length in the front-rear direction, a connecting portion 51*b* connecting between rear ends of upper surfaces of the two rectangular tube portions 51*a* and 51*a*, and hooking portions 51*c* protruding rearward from rear ends of the respective rectangular tube portions 51*a*. This upper cushioning member 51 is mounted on the second arm front-side connecting portion 45 in a state in which respective upper-side protrusions 45U and 45U of the left and right connecting portions 45*a* and 45*a* of the second arm front-side connecting portion 45 are inserted into the two rectangular tube portions 51*a* and 51*a*, respectively, and further each of the hooking portions 51*c* is latched with a rear-side upper portion of the second arm front-side connecting portion 45. With this, the upper cushioning member 51 is securely mounted on the second arm front-side connecting portion 45 in a state covering upper portions of inner surfaces of the connecting recesses 45*b* and 45*b* of the left and right connecting portions 45*a* and 45*a*.

On the other hand, the lower cushioning member 52 is constructed substantially similar to the above-described upper cushioning member 51, and includes two rectangular tube portions 52*a* and 52*a* each extending a predetermined length in the front-rear direction, a connecting portion 52*b* connecting between rear ends of the two rectangular tube portions 52*a* and 52*a*, and hooking portions 52*c* protruding rearward from rear ends of the respective rectangular tube portions 52*a* by a predetermined length. This lower cushioning member 52 is mounted on the second arm front-side connecting portion 45 in a state in which lower-side protrusions 45D and 45D of the left and right connecting portions 45*a* and 45*a* of the second arm front-side connecting portion 45 are inserted into the two rectangular tube portions 52*a* and 52*a*, respectively, and further each of the hooking portions 52*c* is engaged with a rear-side lower portion of the second arm front-side connecting portion 45. With this, the lower cushioning member 52 is securely mounted on the second arm front-side connecting portion 45 in a state covering lower portions of the inner surfaces of the connecting recesses 45*b* and 45*b* of the left and right connecting portions 45*a* and 45*a*.

Figure 9A:
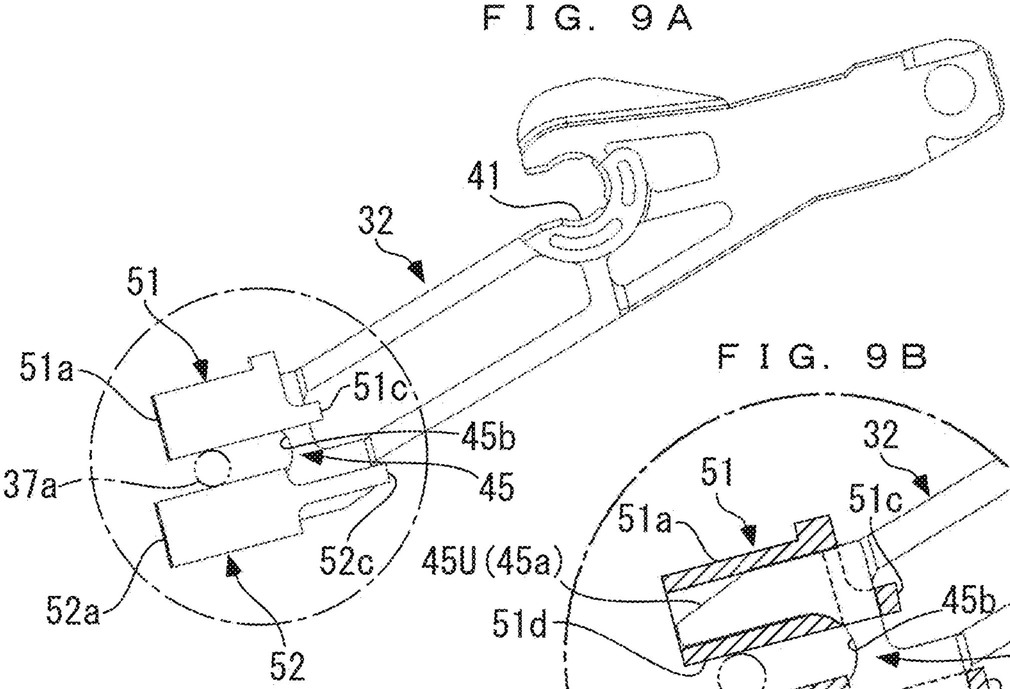
FIG. 9A is a right side view of the second arm and FIG. 9B is an enlarged cross-sectional view of the upper cushioning member and the lower cushioning member.
Figure 9B:
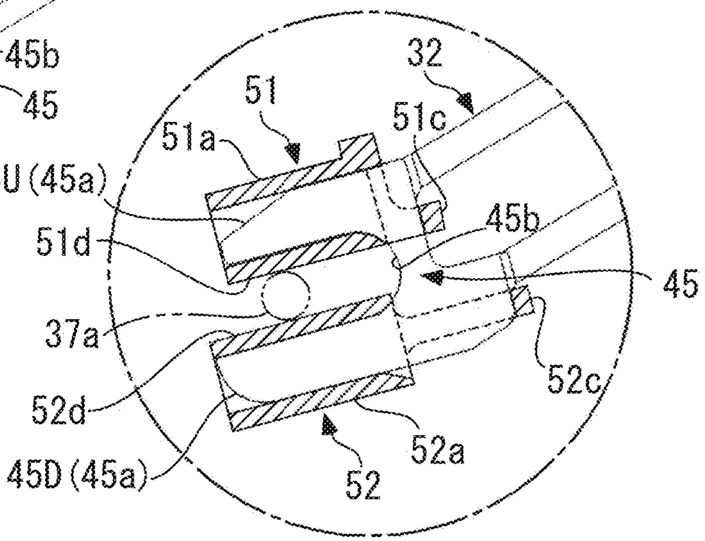

FIG. 9A is a right side view of the second arm 32 having the upper cushioning member 51 and the lower cushioning member 52 mounted thereon, and FIG. 9B is an enlarged cross-sectional view of the two cushioning members 51 and 52. As shown in FIGS. 9A and 9B, in the second arm front-side connecting portion 45 having the two cushioning members 51 and 52 mounted thereon, lower surfaces of the rectangular tube portions 51*a* and 51*a* of the upper cushioning member 51 and upper surfaces of the rectangular tube portions 52*a* and 52*a* of the lower cushioning member 52 are in sliding contact with the connecting shaft 37*a* of the first arm rear-side connecting portion 37 of the first arm 31. Note that in the following description, the lower surface of each rectangular tube portion 51*a* of the upper cushioning member 51 is referred to as "the lower-side sliding contact surface 51*d*" as deemed appropriate, and the upper surface of each rectangular tube portion 52*a* of the lower cushioning member 52 is referred to as "the upper-side sliding contact surface 52*d*" as deemed appropriate.

Figure 10:
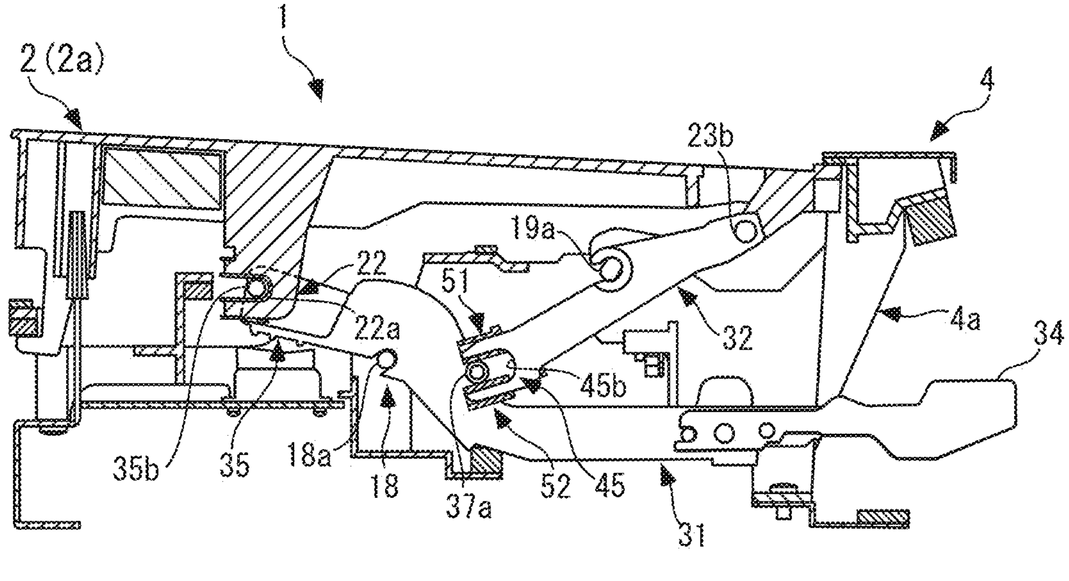
FIG. 10 is a cross-sectional view of the keyboard device, which is similar to FIG. 3B and shows a state in which the upper cushioning member and the lower cushioning member are mounted on the second arm.

FIG. 10 is a view of the keyboard device 1, which is similar to FIG. 3B and shows a state in which the above-described upper cushioning member 51 and lower cushioning member 52 are mounted on the second arm front-side connecting portion 45 of the second arm 32. Further, FIGS. 11A and 11B show, using the keyboard device 1 shown in FIG. 10, forces acting on the key 2 and the second arm 32, which are caused by different key pressing positions at the time of key depression.

Figure 11A:
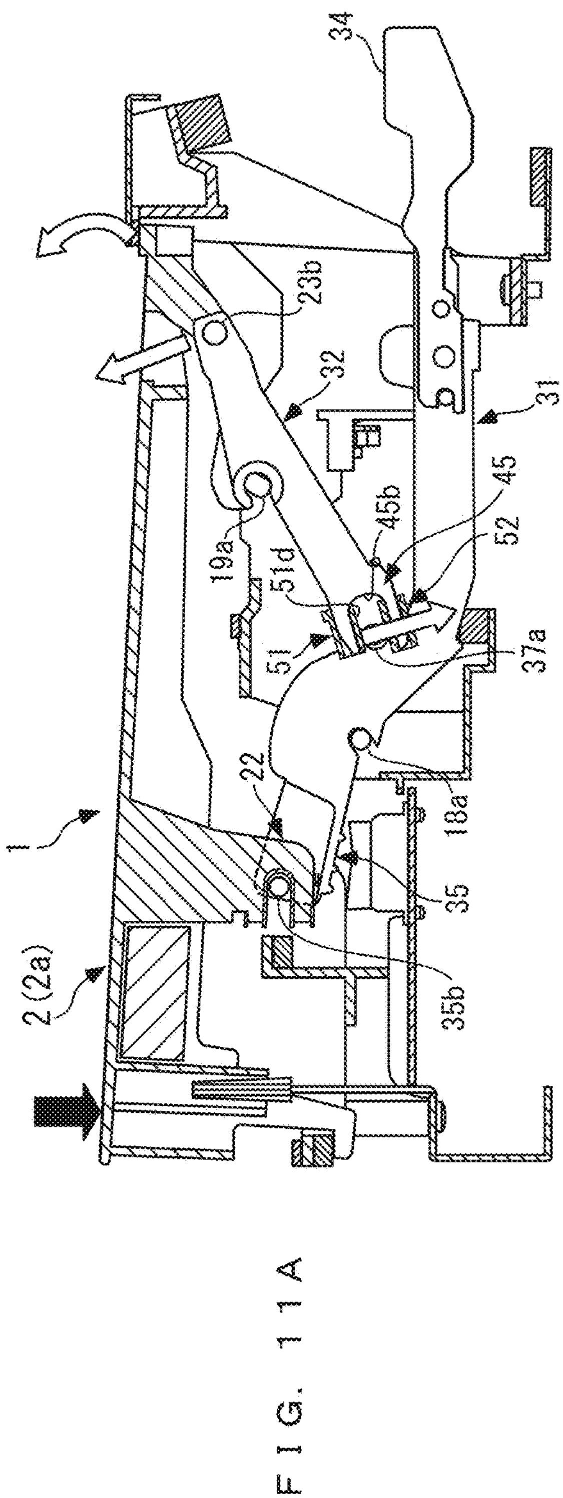

As shown in FIG. 11A, when a front end of the key 2 is depressed (see a black arrow), in the key 2, the connecting shaft 35*b*, which is a connecting portion between the key 2 and the first arm 31, functions as a fulcrum, whereby a rear end of the key 2 is about to pivotally move upward (see an arcuate white arrow). In accordance with this pivotal movement of the rear end of the key 2, a force acts on the second arm 32 connected to the rear end of the key 2 via the engagement protrusions 23*b* to cause pivotal movement of the second arm 32 about the second pivot shaft 19*a* in a counterclockwise direction as viewed in FIG. 11A (see a white arrow on a rear end of the second arm 32). In this case, in the second arm 32, in a state in which, out of the upper cushioning member 51 and the lower cushioning member 52 mounted on the second arm front-side connecting portion 45, the upper cushioning member 51 has the lower-side sliding contact surface 51*d* strongly pressed against the connecting shaft 37*a* which is a connecting portion between the second arm 32 and the first arm 31 (see a white arrow on a front end of the second arm 32), the connecting shaft 37*a* slides toward an inner side of the connecting recesses 45*b*.

Figure 11B:
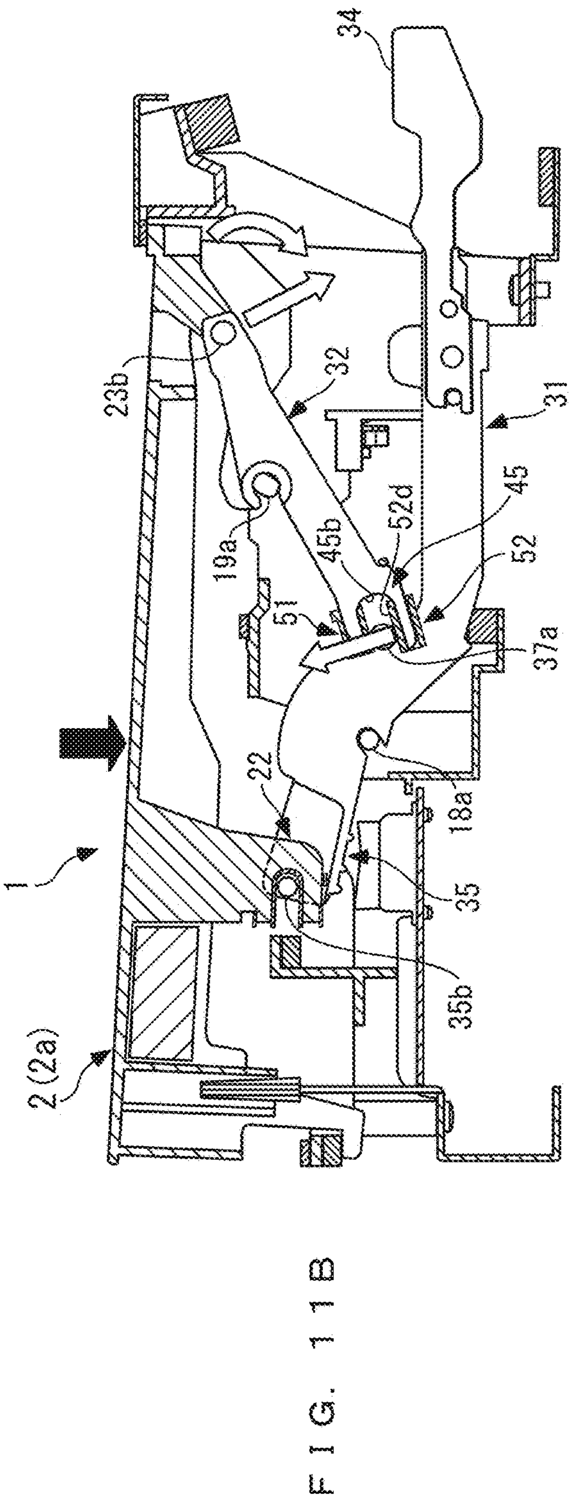

On the other hand, as shown in FIG. 11B, when an inner portion of the key 2 is depressed (see a black arrow), in the key 2, the above-described connecting shaft 35*b* functions as a fulcrum, whereby the rear end of the key 2 is about to pivotally move downward (see an arcuate white arrow). In accordance with this pivotal movement of the rear end of the key 2, a force acts on the second arm 32 connected to the rear end of the key 2 to cause pivotal movement of the second arm 32 about the second pivot shaft 19*a* in a clockwise direction as viewed in FIG. 11B (see a white arrow on the rear end of the second arm 32). In this case, differently from the case described with reference to FIG. 11A, in the second arm 32, in a state in which the upper-side sliding contact surface 52*d* of the lower cushioning member 52 is strongly pressed against the connecting shaft 37*a* of the first arm 31 (see a white arrow on the front end of the second arm 32), the connecting shaft 37*a* slides toward the inner side of the connecting recesses 45*b*.

The following problem is sometimes caused by the above-described difference in the key pressing position of the key 2: As shown in FIG. 11A, in the case where the front end of the key 2 is depressed, the first arm 31 is pivotally moved with good responsiveness, but as shown in FIG. 11B, in the case where the inner portion of the key 2 is depressed, the responsiveness of the first arm 31 is reduced, and it is sometimes impossible to obtain a desired touch feeling. As one of the factors of the reduction of the responsiveness, it is envisaged that the cushioning properties of the upper cushioning member 51 and the lower cushioning member 52 mounted on the second arm 32 are the same.

To solve this problem, the upper cushioning member 51 and the lower cushioning member 52 are configured to have respective different cushioning properties from each other, to thereby adjust the touch feeling obtained in the case where the inner portion of the key 2 is depressed. For example, the lower cushioning member 52 is made of a harder material than that of the upper cushioning member 51, whereby in the case where the inner portion of the key 2 is depressed, it is possible to obtain an excellent operational response of the first arm 31 and consequently obtain a satisfactorily responsive touch feeling.

As described heretofore, according to the keyboard device 1 to which the essential part of the present invention is applied, the upper cushioning member 51 and the lower cushioning member 52, which cover the upper portions and the lower portions of the inner surfaces of the connecting recesses 45*b*, respectively, are mounted on the second arm front-side connecting portion 45 of the second arm32, and the connecting shaft 37*a* of the first arm 31 is brought into sliding contact with the lower-side sliding contact surface 51*d* of the upper cushioning member 51 and the upper-side sliding contact surface 52*d* of the lower cushioning member 52. With this, the connecting shaft 37*a* of the first arm 31 is prevented from directly hitting against the respective inner surfaces of the connecting recesses 45*b* of the second arm 32, and therefore, at the time of key depression, it is possible to prevent generation of noise at the connecting portion between the first arm 31 and the second arm 32 of the key support mechanism 6. Further, it is possible to ensure smooth operation of the connecting portion between the first arm 31 and the second arm 32 to thereby obtain excellent touch feeling when key depression is performed.

Further, as described above, by configuring the upper cushioning member 51 and the lower cushioning member 52 such that they have respective different cushioning properties from each other, it is possible to adjust the touch feeling obtained in the case in which the inner portion of the key 2 is depressed.

Figure 12A:
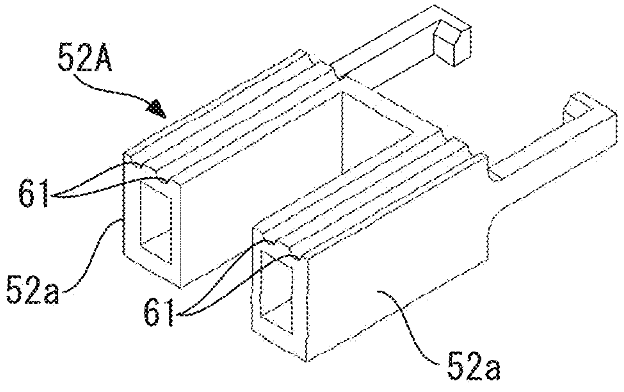
FIGS. 12A to 12C are perspective views of examples of the lower cushioning member configured to have different cushioning properties from that of the upper cushioning member.
Figure 12B:
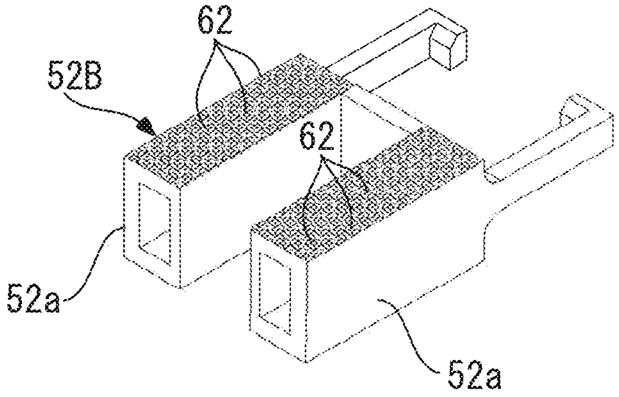
Figure 12C:
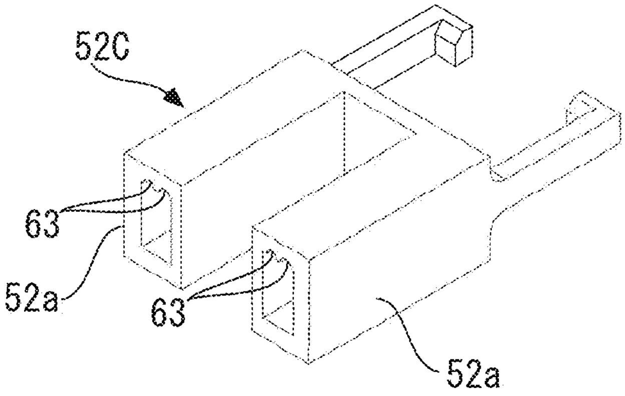

FIGS. 12A to 12C are perspective views of examples of the lower cushioning member 52 configured to have different cushioning properties from that of the upper cushioning member 51. In a lower cushioning member 52A shown in FIG. 12A, each rectangular tube portion 52*a* has an upper surface thereof formed with two grooves 61 and 61 extending the entire longitudinal length of the upper surface of the rectangular tube portion 52*a*. Further, in a lower cushioning member 52B shown in FIG. 12B, each rectangular tube portion 52*a* has an upper surface thereof formed with a large number of protrusions 62. Furthermore, in a lower cushioning member 52C shown in FIG. 12C, each rectangular tube portion 52*a* has an upper inner surface thereof formed with two grooves 63 and 63 extending the entire longitudinal length of the upper inner surface of the rectangular tube portion 52*a*. Since the lower cushioning member 52 is constructed as described above, even if the lower cushioning member 52 is formed of the same material as that of the upper cushioning member 51, it is possible to relatively easily obtain the lower cushioning member 52 different in cushioning property from the upper cushioning member 51.

Note that details of the constructions of the keyboard device 1, the keys 2, the key support mechanism 6, the upper cushioning member 51, and the lower cushioning member 52 shown in the embodiment are given only by way of example, and they can be modified as appropriate within the scope of the subject matter of the present invention.

It is further understood by those skilled in the art that the foregoing are preferred embodiments of the invention, and that various changes and modifications may be made without departing from the spirit and scope thereof.

What is claimed is:

1. A keyboard device for a keyboard instrument, comprising:

a keyboard chassis;

a key extending a predetermined length in a front-rear direction and disposed on the keyboard chassis; and a key support mechanism engaged with the keyboard chassis and provided so as to support the key from below, the key support mechanism causing, upon depression of the key, the depressed key to operate such that the key pivotally moves about a virtual pivot located rearward of a rear end of the key, wherein the key support mechanism includes:

a first arm configured to extend a predetermined length in the front-rear direction and be swingably engaged with a first pivot shaft provided on the keyboard chassis, the first arm having a front end pivotally and slidably connected to a front portion of the key; and a second arm configured to extend a predetermined length in the front-rear direction and be swingably engaged with a second pivot shaft provided on the keyboard chassis at a location rearward of the first pivot shaft, the second arm having a rear end pivotally connected to a rear portion of the key, and including a second arm front-side connecting portion which is disposed forward of the second pivot shaft and is pivotally and slidably connected to a first arm rear-side connecting portion rearward of the first pivot shaft of the first arm, wherein one of the first arm rear-side connecting portion and the second arm front-side connecting portion includes an engagement shaft extending in a left-right direction, wherein the other of the first arm rear-side connecting portion and the second arm front-side connecting portion includes an engagement recess which has a U shape in side view open in one of a front direction and a rear direction and is engaged with the engagement shaft, and wherein the engagement recess has an upper cushioning member and a lower cushioning member mounted thereon, the upper cushioning member and the lower cushioning member being in sliding contact with an outer peripheral surface of the engagement shaft in a state covering an upper portion and a lower portion of an inner surface of the engagement recess, respectively.

2. The keyboard device according to claim 1, wherein the upper cushioning member and the lower cushioning member are configured to be different in cushioning property from each other.

3. The keyboard device according to claim 2, wherein the lower cushioning member is formed to be harder than the upper cushioning member.

* * * * *